No. 895,783. PATENTED AUG. 11, 1908.
J. M. O'KELLY.
DUMPING CAR.
APPLICATION FILED OCT. 28, 1907.
2 SHEETS—SHEET 2.
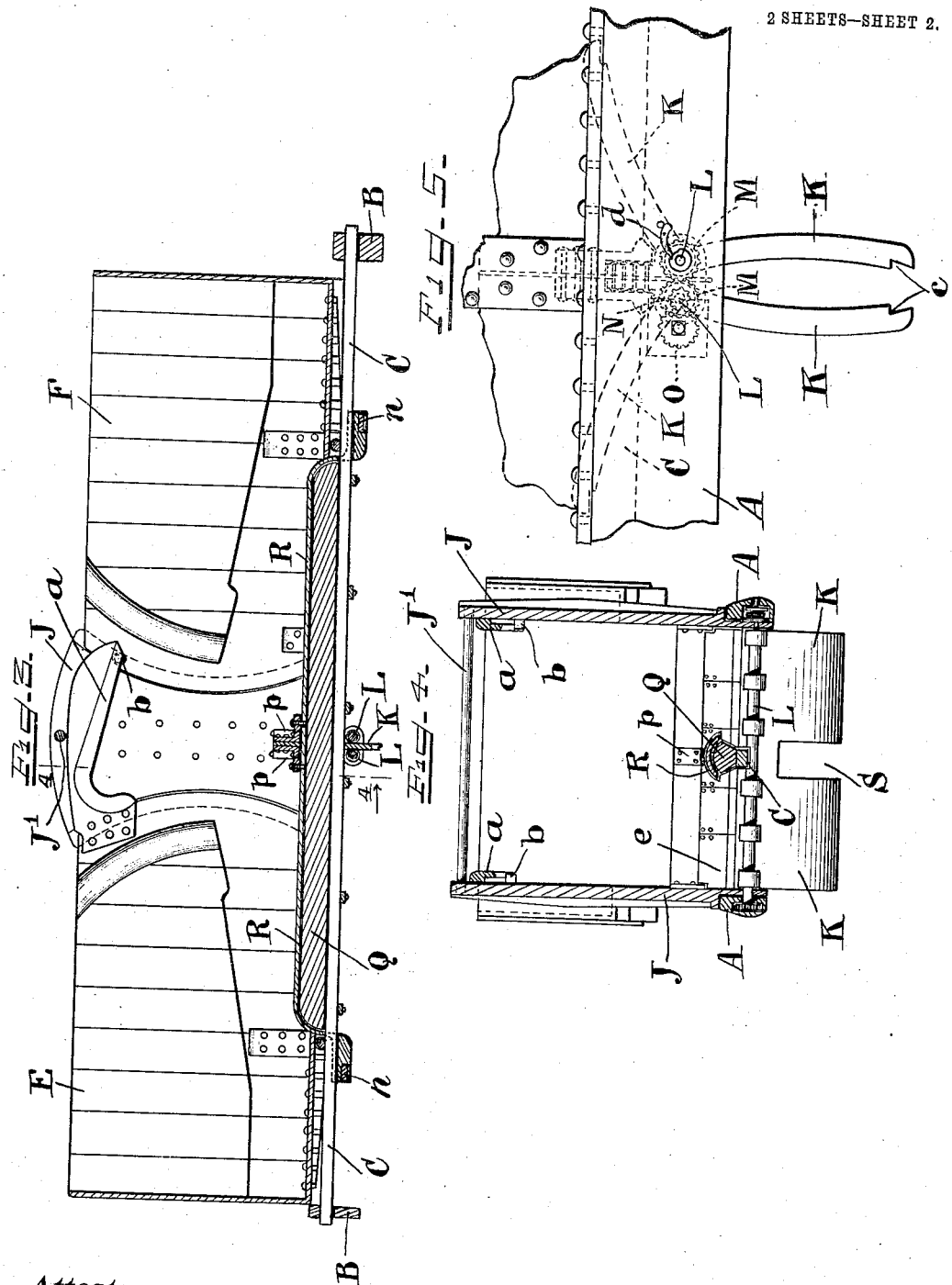
Attest:
E. D. Mitchell
C. S. Ashley
Inventor:
by James Morris O'Kelly
Dickerson, Brown & Raegener Attys.

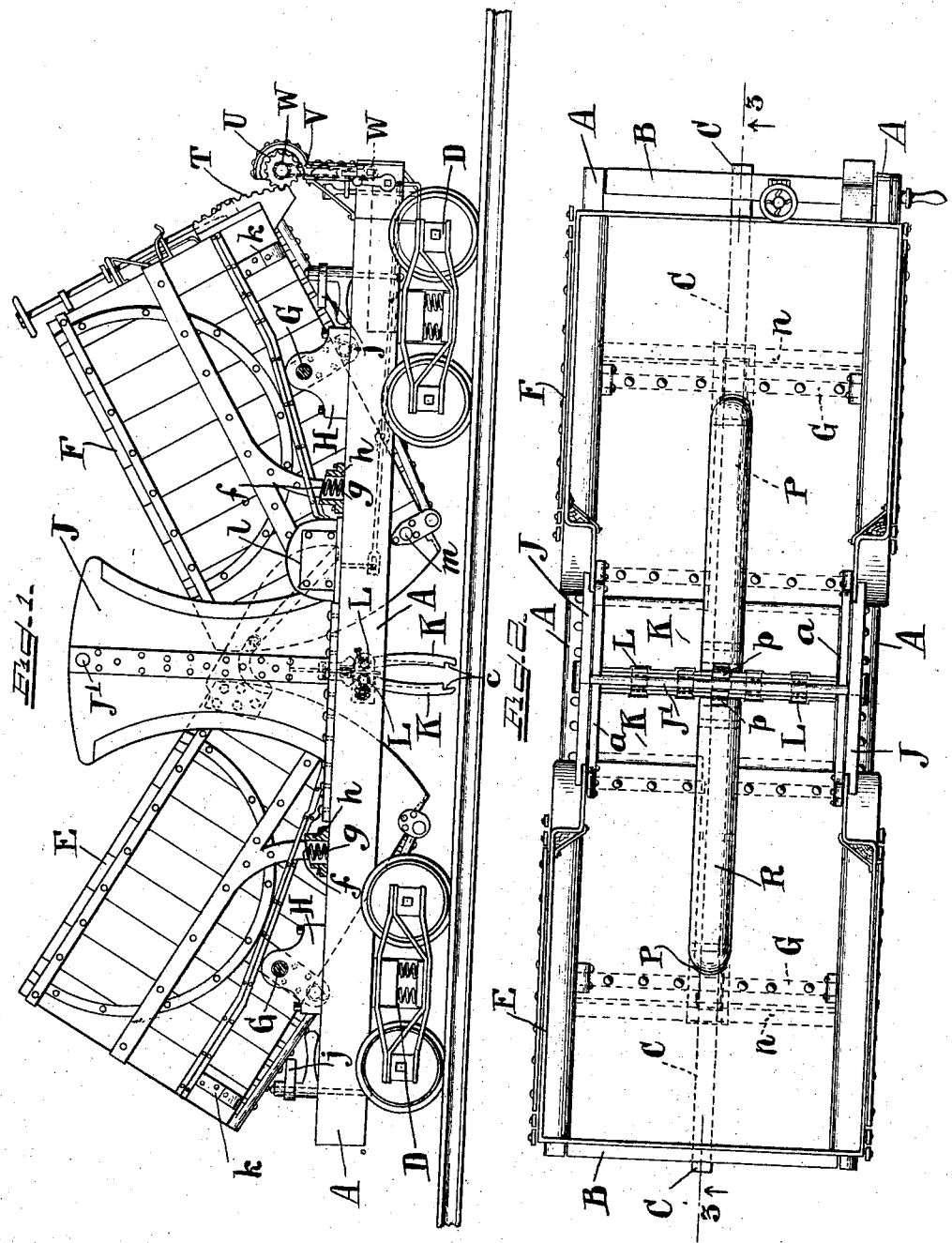

UNITED STATES PATENT OFFICE.

JAMES MORRIS O'KELLY, OF NEW YORK, N. Y.

DUMPING-CAR.

No. 895,783.　　　Specification of Letters Patent.　　　Patented Aug. 11, 1908.

Application filed October 28, 1907. Serial No. 399,567.

*To all whom it may concern:*

Be it known that I, JAMES MORRIS O'KELLY, a citizen of the United States, and resident of the borough of Manhattan, city, county, and State of New York, have invented certain new and useful Improvements in Dumping-Cars, of which the following is a specification accompanied by drawings.

This invention relates to dumping cars, more particularly to sectional dumping cars for railroad use, and the objects of the invention are to improve the construction of such devices whereby an enlarged opening is provided between the car sections to permit of easy dumping of material in the car. The car is also designed to hold a maximum load, with simplicity of parts and cheapness of manufacture.

To the accomplishment of these objects and such others as may hereinafter appear the invention comprises the novel construction and combinations of parts hereinafter described and particularly pointed out in the appended claims, reference being had to the accompanying drawings forming a part hereof, in which the same reference characters designate like parts throughout the several views, and in which:—

Figure 1 is a side view of the dumping car showing the car sections in a tilted position and the intermediate doors opening for dumping; Fig. 2 is a plan view of the car in a closed position; Fig. 3 is a sectional view on the line 3—3 of Fig. 2 with parts broken away; Fig. 4 is a sectional view on the line 4—4 of Fig. 3 with parts broken away; Fig. 5 is an enlarged detail view of the intermediate doors with parts broken away.

Referring to the drawings, the frame of the car upon which the car sections are supported, consists of the longitudinal members A and the transverse members B secured to the end of the same in any desired manner to form a rectangular frame. Secured to the middle of the transverse members B is a draw bar C which is preferably made of metal so that it may resist heavy strains to which the draw bar is subjected when a number of cars are coupled together in the usual manner. The frame of the car, as before described, is mounted upon suitable trucks D, one at each end as shown in Fig. 1.

The body of the car is preferably of metal construction and is made in two sections E and F, each of which is pivotally supported upon the longitudinal members A by means of pivot rods G which are secured to the sides of each of the car sections in any desired manner, the ends of the pivot rod G being journaled in bearings H secured to the frame members A. The pivot rods G are preferably located toward the outer end of the car sections so that when the car sections are unlocked the same will dump of their own weight as shown in Fig. 1. The pivot rods G, instead of being placed on the bottom of the car sections, are preferably spaced a short distance above the bottom so that the car sections will have a maximum capacity and when in a dumping position will not extend too far upward.

The car sections E and F are closed at the outer ends and open at the inner ends, the sides of the car sections at the inner ends being cut away on the arc of a circle so as to permit the car sections to assume a dumping position. To the center of the longitudinal members A are rigidly secured the side plates J which extend over the inner curved ends of the sides of the car sections, the same being preferably bent inward so as to suitably conform to the side plates J, which are secured to the inner side of the longitudinal members A. The side plates J are held firmly in position at the top by means of a cross rod J' which is secured at each end to the sides of the plates. The car sections E and F are cut away at the bottom of their inner ends so as to leave an enlarged opening between the ends of the car sections. This enlarged opening between the bottoms of the car sections is closed by means of the intermediate doors K which are pivoted to the longitudinal members A by means of the pivot rods L to each of which is secured one of the doors K. The ends of the pivot rods L are provided with the gears M which mesh one with the other so as to move both of the doors together. One of the pivot rods L is also provided with a small gear N which meshes with another gear O to which a crank may be secured for the purpose of raising or lowering the doors K into or out of position, as clearly shown in Fig. 5, although if desired the gears N and O may be dispensed with and the crank may be connected directly to the end of one of the pivot rods L.

To permit the car sections to dump when the frame of the car is provided with a draw bar C, as above described, the bottom of each of the car sections is provided with a longitudinal slot P which is located directly above the draw bar C and extends from the pivot rods G to the inner ends of the car sections. In order to cover the slots P when the car sections are closed, the top of the draw bar C underneath the slots P is provided with the member Q which is preferably wedge-shaped and projects above the bottom of the car sections, thereby closing the slots P and preventing any of the material in the car from falling through the slots P when the car sections are closed.

The intermediate doors K in the present instance are pivoted below the draw bar C and the same are provided with slots S which are adapted to fit the wedge-shaped member Q when the intermediate doors K are on a closed position.

The car sections are lifted into their closed or horizontal position by means of the curved rack T which is secured to the outer end of the car section F and which meshes with a pinion U secured to one end of the car frame in any desired manner. The pinion U is operated by means of a sprocket chain V which meshes with the sprockets W, one of which is secured to the pinion U and the other being pivoted to the longitudinal member A, the same being operated by means of a crank so as to rotate the pinion U which meshes with the rack T to move the car sections either up or down, as desired.

In order to simultaneously move the car section E with the car section F, the car section E is provided with projecting cams $a$ secured to the top of the car section E at each side thereof, the outer ends of the cams $a$ engaging pins $b$ secured to the top of the car sections F so that when it is desired to close the car sections, the closing of the car section F will also close the car section E. When it is desired to open the car sections so as to dump the contents of the car, the pinion U is operated, which tilts the car sections F and the car section E is simultaneously tilted, due to its own weight. As the car sections are tilted the intermediate doors K are simultaneously opened and the contents of the car is thereby allowed to pass out freely through the enlarged opening caused by the falling of the intermediate doors K. When it is desired to close the car the intermediate doors K are first moved into position as shown in dotted lines in Fig. 5, the same being held by means of a small pawl $d$ until the car sections are returned to a horizontal position by operating the pinion U. The pawl $d$ can then be released, as the intermediate doors K are provided with recessed portions $c$ which interlock with the bottom of the car sections to hold the same in position.

From the above it will be seen that the intermediate doors K are held in position when the car sections are closed, and that when the same is tipped, as before described, the doors K are released, thereby making a large opening through which the material in the car readily passes.

Suitable bumpers $f$ secured to the sides of the car sections are adapted to engage the coiled springs $g$ which are incased in the casing $h$ secured to the longitudinal members A, so as to relieve the jar of the car sections when dumping.

When the car sections are closed the same are locked in position by means of the pivoted latches $j$ which are secured to the longitudinal members A and which are adapted to engage the projecting lugs $k$ secured to the sides of the car sections. Automatic means $l$ may also be secured to the longitudinal member A which is adapted to engage a pin $m$ secured to the car section F when the same is in a closed position. As this particular looking device forms no part of my present invention, I have not described the same in detail.

To prevent the material in the car from resting upon the member Q and causing transverse strains upon the draw bar C there is provided a cover plate R which is supported above the member Q by means of suitable brackets $p$ which are secured to the transverse plate $e$ as shown in Figs. 3 and 4. The outer ends of the cover plate R are suitably bent so as to pass through the inner ends of the slots P and are supported upon the transverse rods $n$ which are secured to the longitudinal members A in the rear of the pivot rods G.

It is very important that the draw bar C should not be subject to any transverse strains as the tension on the draw bar is often very great especially when a large number of cars are coupled together, but by my improved cover plate it will be seen that all transverse strains due to the material in the car resting upon that portion of the draw bar above the slots P is obviated.

If the car sections E and F were made so that their bottom edges would meet or overlap each other, it would be found that the opening between the inner ends of the bottom of the car sections when the same were in a dumping position, would not afford a sufficient opening for the material to pass out of the car sections without becoming bridged or clogged. It is for this reason that the bottom of the inner ends of the car sections are cut away and the opening so formed closed by means of the intermediate doors K. It will be seen that a dumping car provided with intermediate doors as above described, will permit of the car sections being dumped when the same are tipped through only a small arc. As the car sections have to be only slightly tipped to dump the contents of same, this fact will permit of the car sections being made of a maximum depth, as the top of the car sections when in a dumping position will not extend upward to any appreciable extent. The car sections can also be pivoted to the sides of the frame so that a portion of the car section is below the pivot point, thereby keeping the center of gravity as low as possible.

While the invention has been described with particular reference to the details of construction, it should be understood that it is not to be limited thereto, as many and various changes, alterations and substitutions may be made therein and still fall within its scope and principle; but What I do claim, and desire to secure by Letters Patent, is:—

1. A dumping car comprising a supporting frame, car sections pivoted to said frame, means for dumping said car sections and means controlled by said car sections for securing an enlarged opening between the car sections when in a dumping position.

2. A dumping car comprising a supporting frame, car sections pivoted to said frame and intermediate doors pivoted to said frame between the car sections and arranged to automatically dump with said car sections.

3. A dumping car comprising a supporting frame, car sections pivoted to said frame and means operated by said car sections for securing an enlarged opening between the car sections when in a dumping position.

4. A dumping car comprising a supporting frame, car sections pivoted to said frame at each end thereof, said car sections being cut away at the bottom of their inner ends, and doors between said car sections arranged to overlap the inner ends of said car sections.

5. A dumping car comprising a supporting frame, a draw-bar secured to said frame, car sections pivoted to said frame, said sections being arranged to be tilted past said draw-bar and a cover plate secured to said frame and arranged above said draw bar.

6. A dumping car comprising a supporting frame, a draw-bar secured to said frame, car sections pivoted to said frame, said sections being arranged to be tilted past said draw-bar and means for preventing the material in the car from resting on said draw bar.

7. A dumping car comprising a supporting frame, a draw-bar secured to said frame, car sections pivoted to said frame, said sections being arranged to be tilted past said draw-bar and means secured to said frame and arranged above said draw bar for preventing the material in the car from resting on said draw bar.

8. A dumping car comprising a supporting frame, a draw-bar secured to said frame, car sections pivoted to said frame, intermediate doors pivoted to said frame between said car sections, said sections and said door being arranged to be tilted past said draw-bar, and means for preventing the material in the car from resting on said draw-bar.

9. A dumping car comprising a supporting frame, car sections pivoted to said frame and arranged to be tilted below the plane of said supporting frame and means connected to the inner ends of said car sections for securing an enlarged opening between the car sections when in a dumping position.

In testimony whereof I have signed this specification in the presence of two subscribing witnesses.

JAMES MORRIS O'KELLY.

Witnesses:
  LEO. J. MATTY,
  FRANK ROFFMAN.